United States Patent
Guard

(10) Patent No.: US 7,226,019 B2
(45) Date of Patent: Jun. 5, 2007

(54) EFFICIENT CARGO LINER INSTALLATION

(75) Inventor: Peter S. Guard, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/173,621

(22) Filed: Jul. 1, 2005

(65) Prior Publication Data

US 2005/0258309 A1    Nov. 24, 2005

Related U.S. Application Data

(63) Continuation of application No. 10/402,508, filed on Mar. 27, 2003, now Pat. No. 6,951,321.

(51) Int. Cl.
*B64C 1/20* (2006.01)

(52) U.S. Cl. ....................... 244/131; 244/121

(58) Field of Classification Search ............... 244/117, 244/119, 120, 121, 132, 131; 296/39.2, 39.1; 264/273, 279.1; 403/399, 298, 359.1, 391
See application file for complete search history.

(56) References Cited

U.S. PATENT DOCUMENTS

| | | |
|---|---|---|
| 3,232,395 A | 2/1966 | Barge |
| 3,557,741 A | 1/1971 | Teasdale et al. |
| 3,701,964 A | 10/1972 | Cronin |
| 3,832,820 A | 9/1974 | Eggert |
| 3,868,042 A | 2/1975 | Bodenheimer |
| 3,949,155 A | 4/1976 | Bourne |
| 3,980,196 A | 9/1976 | Paulyson et al. |
| 4,036,257 A | 7/1977 | Hanson et al. |
| 4,054,226 A | 10/1977 | Bjelland et al. |
| 4,071,194 A | 1/1978 | Eckert et al. |
| 4,124,136 A | 11/1978 | Bjelland et al. |
| 4,452,029 A | 6/1984 | Sukolics |
| 4,592,583 A | 6/1986 | Dresen et al. |
| 4,631,036 A | 12/1986 | Grothues-Spork |
| 4,679,011 A | 7/1987 | Praba et al. |
| D298,817 S | 12/1988 | Hamilton |
| 4,911,493 A | 3/1990 | Muirhead |
| 5,083,827 A | 1/1992 | Hollenbaugh, Sr. |
| 5,110,171 A | 5/1992 | Anthony |
| 5,253,918 A | 10/1993 | Wood et al. |
| 5,398,889 A | 3/1995 | White et al. |
| 5,421,476 A | 6/1995 | Matias |
| 5,509,986 A | 4/1996 | McCullough, Jr. |

(Continued)

FOREIGN PATENT DOCUMENTS

DE          1509118          7/1970

(Continued)

*Primary Examiner*—Tien Dinh
(74) *Attorney, Agent, or Firm*—Lee & Hayes, PLLC

(57) ABSTRACT

An apparatus and method for lining a cargo hold, and an aircraft cargo hold so lined are provided. A plurality of liner panels have formed edges angling away from facing sides of the liner panels. A mounting channel mounted on a supporting structure has an opening for receiving the angled edges of the liner panels. The edges of the liner panels are inserted into the mounting channel. The liner panels are secured by a spline configured to forcibly lock the liner panels into the mounting channel when the spline is pressed against the angled edges of the cargo liner sections and into the mounting channel.

21 Claims, 5 Drawing Sheets

U.S. PATENT DOCUMENTS

| | | |
|---|---|---|
| 5,626,254 A | 5/1997 | Podd et al. |
| 5,723,515 A | 3/1998 | Gottfried |
| 5,788,888 A | 8/1998 | Cohen et al. |
| 5,884,900 A | 3/1999 | Gobeil et al. |
| 5,934,729 A | 8/1999 | Baack |
| 6,196,607 B1 | 3/2001 | Gulisano |
| 6,199,798 B1 | 3/2001 | Stephan et al. |
| 6,286,785 B1 | 9/2001 | Kitchen |
| 2002/0140245 A1 | 10/2002 | Coleman, II et al. |

FOREIGN PATENT DOCUMENTS

| | | |
|---|---|---|
| FR | 1381143 | 10/1964 |
| FR | 2391386 | 1/1979 |
| GB | 1509118 | 10/1963 |
| GB | 2287517 | 9/1995 |

EFFICIENT CARGO LINER INSTALLATION

CROSS-REFERENCE TO RELATED APPLICATIONS

This application constitutes a continuation of the commonly-owned U.S. patent application Ser. No. 10/402,508 entitled "EFFICIENT CARGO LINER INSTALLATION," filed on Mar. 27, 2003 now U.S. Pat. No. 6,951,321.

FIELD OF THE INVENTION

This invention relates generally to cargo liners and, more particularly, to an aircraft cargo liner.

BACKGROUND OF THE INVENTION

The cargo hold of an aircraft or cargo compartment of another carrier presents a number of issues for those who design, install, maintain, and use them. However, many of these issues may be unappreciated by the countless people who ship their packages or travel onboard each day.

Taking the example of an aircraft cargo hold, the aircraft cargo hold is lined with a protective cargo liner. Known cargo liners are typically made of a phenolic glass liner material. As a result, the cargo liner can be delicate. Conventional cargo liners are very difficult to install. Moreover, they can be difficult to maintain in proper condition.

The cargo hold of a typical aircraft is defined by a supporting structure of beams and other structural members inside the aircraft. Panels are then attached to those structural members to form an enclosed space which will become the cargo hold. Conventionally, installers cut the panels from bulk sheet material. The panels are joined together at structural members, where the panels are fastened to the supporting structure.

This conventional type of installation proves to be very difficult and time-consuming. In addition to the panels being cut to fit between structural members, the panels must be cut to fit around light fixtures, fire and smoke detectors, and fire suppression agent dispensing nozzles. Cutting the panels to fit all these parameters must be carefully done and takes a great deal of time.

Once the panels are cut, attaching them to each other and to the supporting structure can prove to be an even more troublesome task. The panels are typically fastened to the structural members with scrivets or similar fasteners. Each fastener hole must be drilled and installed while holding the panels in place. This process is difficult on what will represent the floor and the lower walls of such a cargo hold. Moreover, the process is even more difficult in installing panels on what will represent the upper walls and ceiling of the compartment. Installers have to support the loose panels, drill holes, and screw in the fasteners, all potentially while reaching over their heads. The panels are composed of a flexible material which is difficult to hold in place, particularly while trying to support a panel flopping and drooping above one's head. This is difficult and tiring work, which presents a heightened chance for injuries ranging from getting debris in one's eye to straining one's back, neck, and other sensitive and important muscle groups. Clearly, such a process is very labor intensive and requires many labor hours to complete.

Once installed, at least two important issues remain. First, a cargo hold must be able to seal in smoke and fire suppression agents. In the event of a fire during flight, smoke must be sealed in to prevent it from reaching a passenger cabin and harming the passengers and crew. Further, while aircraft are equipped with chemical fire suppression systems which can extinguish cargo fires, the chemical fire suppression agents must also be contained because the chemicals also are potentially harmful to passengers and crew onboard. The smoke and fire suppression containment capacity of the cargo hold must pass rigorous initial and subsequent inspections. Thus, the process of sealing the edges of the panels to the supporting structure not only is labor intensive in installing the panels, but in maintaining the integrity of the panels and the cargo hold over time.

Other concerns stem from operational considerations of the cargo hold. Inner sides of the panels lining the cargo hold desirably are covered with a light-colored material to enhance light and visibility for those working in the cargo hold. Also, locations in the cargo hold are identified so it can be known what cargo is in which location in the cargo hold to facilitate unloading and transfer of cargo. Thus, once conventional liner panels are installed, they must be labeled to signify their location in the cargo hold. Labels are typically applied with an adhesive and sealed to the panel for durability.

Coloring and labeling of the liner panels presents at least three further concerns. First, cargo can strike the panels during loading, unloading, and in-flight shifting. This can result in the light-colored surface of the panels being marred, undermining the aesthetic appearance of the cargo hold. Second, similarly, cargo can strike the labels during loading, unloading, and shifting of cargo. This may result in the labels be damaged to the point where they cannot be read, or the labels may be torn completely from the panels. The labels then have to be repaired or recreated, and workers will be at least inconvenienced until the label is repaired. Third, before a customer takes delivery of an aircraft, the customer will inspect the hold and the location labels. Commonly, a cargo hold will not pass inspection if the walls of the cargo hold are marred or the labels are not satisfactorily and aesthetically applied.

Thus, there is an unmet need in the art for a cargo hold liner of an aircraft that involves simplified installation, that maintains integrity to contain smoke and fire suppression agents, and that durably bears compartment location information.

SUMMARY OF THE INVENTION

Embodiments of the present invention provide an apparatus and a method for lining a cargo compartment and an aircraft cargo hold lined thereby. Mounting channels are mounted on a supporting structure. Angled ends of shaped liner panels are inserted into the mounting channels and secured in place by insertion of spline sections, thereby simplifying installation. Installation is suitably accomplished without cuffing and drilling panels, or having to support flexing panels while attempting to secure them in place. The spline-secured edges facilitate containment of smoke and fire suppression agents. Further, because panels are made to fit identified locations, openings for lights, smoke detectors, and suppression agent nozzles can be preformed in the panels, further simplifying installation. Also because panels are made to fit identified locations, cargo locations can be integrally printed onto the liner panels, providing for cargo location labels that are durable and that aesthetically match the cargo panels.

More specifically, embodiments of the present invention provide an apparatus and a method for lining a cargo hold. A plurality of liner panels each having formed edges angling away from facing sides of the liner panels. A mounting channel mounted on a supporting structure has an opening for receiving the angled edges of the liner panels. The edges of the liner panels are inserted into the mounting channel. The liner panels are secured by a spline configured to forcibly lock the liner panels into the mounting channel when the spline is pressed against the angled edges of the cargo liner sections and into the mounting channel.

In accordance with further aspects of the present invention, the angled ends of the liner panels are shaped to wrap around the ends of a securing tongue of the spline and/or a back of an adjoining liner panel inside the mounting channel. Alternatively, the ends of the liner panels are shaped in a hairpin shape compressed against inner walls of the mounting channel when the securing tongue of the spline is pressed into the mounting channel. In addition to the securing tongue, the spline has a connecting strip and a sealing member with integral sealing strips such that when the securing tongue is pressed into the mounting channel to engage the edges of the liner panels, the connecting strip pulls the sealing member against a joint between the liner panels, thereby securing the sealing strips between the spline and the liner panels and sealing the joint. Joints between sections of spline are sealed by a junction cover fastened to at least one of the mounting channel or the supporting structure of the cargo compartment by a fastener. A washer can be used to seal the fastener against a fastener opening in the junction plate. The cargo compartment thus seals in smoke and fire retardant agents.

In accordance with further aspects of the invention, the liner panels are shaped to incorporate light fixtures, fire detectors, fire suppression agent nozzles, and similar openings. The openings can be shaped in concave dish features such that the devices in the openings are protected against cargo movement. In addition, dish features can be formed in the panels to structurally stiffen the panels. The panels include a substantially light reflecting material configured to reflect ambient light energy striking the liner panels and improve visibility in the cargo hold. Also, facing sides of the liner panels are imprinted with location points signifying cargo locations corresponding with installation placement of the liner panels. Imprinting of the facing sides of the liner panels are sublimation imprinted, making the labeling durable to resist damage from cargo movement. The liner panels suitably are formed of reinforced thermoplastic laminate.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide an apparatus and a method for lining a cargo hold, and an aircraft cargo hold lined thereby. A plurality of liner panels each having formed edges angling away from facing sides of the liner panels. A mounting channel mounted on a supporting structure has an opening for receiving the angled edges of the liner panels. The edges of the liner panels are inserted into the mounting channel. The liner panels are secured by a spline configured to forcibly lock the liner panels into the mounting channel when the spline is pressed against the angled edges of the cargo liner sections and into the mounting channel.

Figure 1:
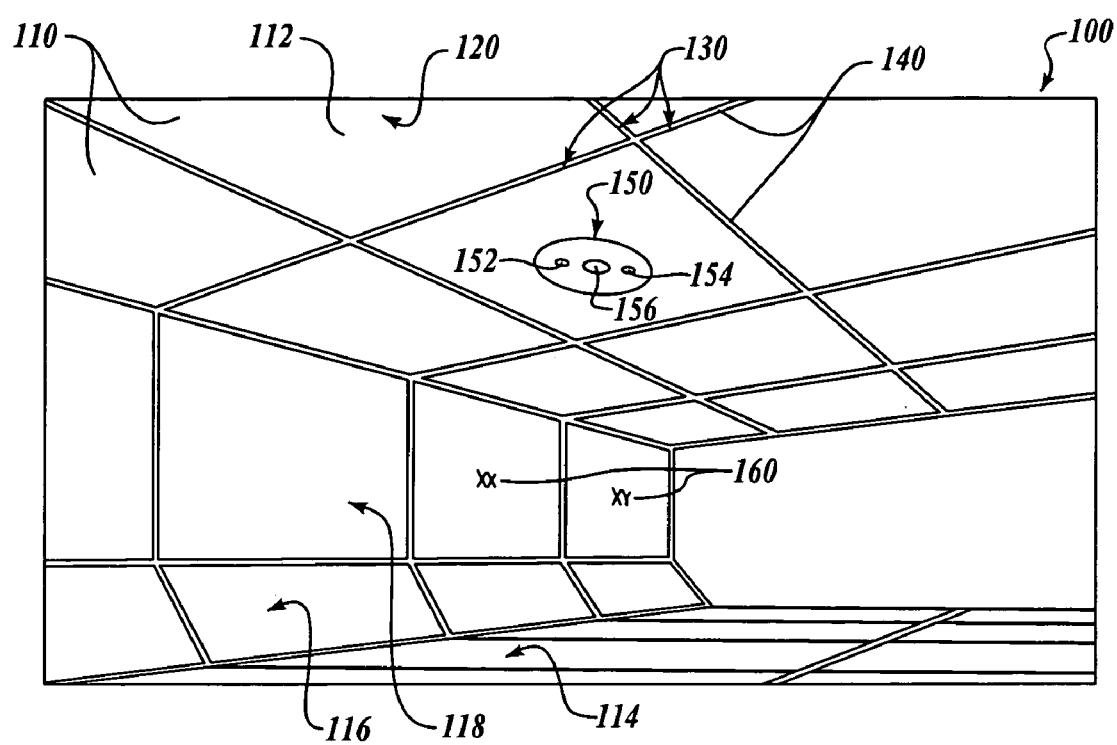
FIG. 1 is a perspective view of a portion of a cargo hold in which liner panels have been installed according to an embodiment of the present invention.

FIG. 1 shows a perspective view of a portion of a cargo hold 100 in which liner panels 110 have been installed according to an embodiment of the present invention. More specifically, FIG. 1 shows facing sides 112 of the panels 110 which form a floor 114, lower walls 116, upper walls 118 and a ceiling 120 of the cargo hold 100. Where panels 110 meet at joints 130, the panels 110 are secured in a mounting channel (not shown). As will be further described, the liner panels 110 have angled edges (not shown) angling away from the facing sides 112 of the liner panels 110. At the joints 130, the angled edges (not shown) are received by an opening (not shown) in the mounting channels (not shown). The liner panels 110 are then forcibly secured in place by sections of a spline 140. The spline sections 130 forcibly secure the angled edges (not shown) of the liner panels 110 into the mounting channels (not shown), advantageously simplifying installation over conventional drilling and fastener installation as previously described.

The mounting channels (not shown) can be secured to a supporting structure (not shown) of the cargo hold 100 in a number of ways. Ends of the mounting channels can be secured at ends to a structure of the aircraft or other carrier. Alternatively, where a joint 120 will exist over a support member (not shown) of the supporting structure, the mounting channels can be secured through a back portion (not shown) of the mounting channel to the supporting member.

The mounting channels can be composed of a number of materials. The mounting channels can be made of steel, aluminum, and other materials of suitable durability as will be understood by one ordinarily skilled in the art. Similarly, the mounting channels are coupled to the supporting structure of the aircraft or other carrier using fasteners or other attachment techniques appropriate to the position of the mounting channel and understood by one ordinarily skilled in the art. Where the mounting channels will provide structural support for surfaces of the cargo hold, particularly for a floor of a cargo hold, it is desired that the mounting channels be suitably rigid and capable of supporting weight of panels, cargo, and personnel along a longitudinal dimension of the mounting channel. In the example of FIG. 1, the mounting channels run parallel to and beneath the spline sections 130. Transverse to the longitudinal dimension of the mounting channels, it is desirable that the mounting channel be at least slightly deformable in order to accommodate installation of the spline sections 120, as will be further described.

Figure 2:
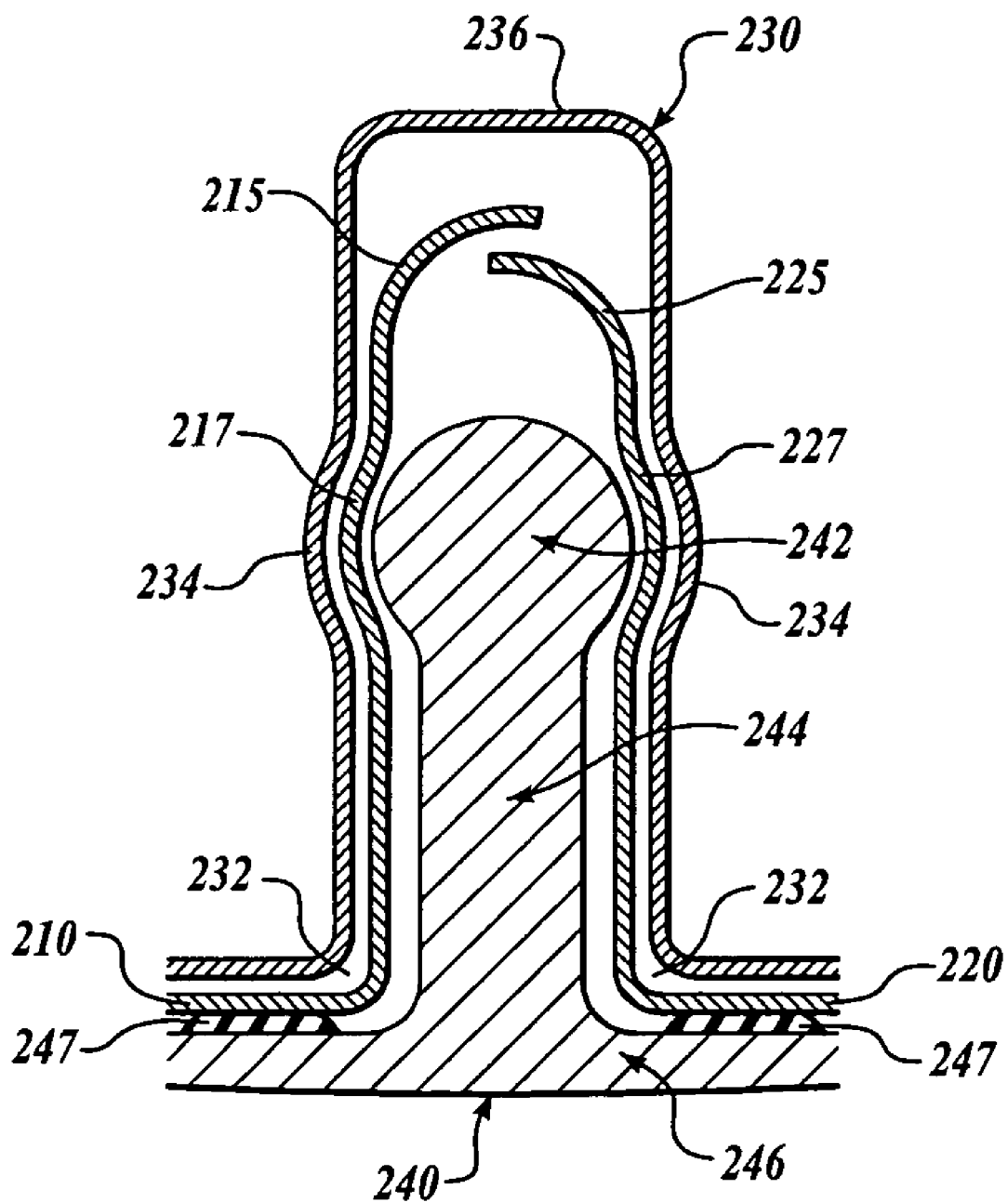
FIG. 2 is a cross-sectional view of angled edges of two liner panels joined in a mounting channel using a first form of angled edges of the liner panels.

FIG. 2 is a cross-sectional view of a first liner panel 210 and a second liner panel 220 joined in a mounting channel 230 and secured by a spline section 240 according to one presently preferred embodiment of the present invention. The cross-sectional view is across the mounting channel 230. As previously described, the mounting channel 230 can be mounted to the structural supports (not shown) of the aircraft or carrier in which the cargo hold is installed. Alternatively, the mounting channel can be secured to an underlying structural support through a backside 236 of the mounting channel 230. The mounting channel 230 has a receiving opening 232 and a securing groove 234 which, in this embodiment, is at a widened midsection of the mounting channel 230. The reasons for shaping the securing groove 234 in this form will be further explained below.

The liner panels 210 and 220 suitably are formed of reinforced thermoplastic laminate or a similar material which can be molded into desired shapes. To mount the liner panels 210 and 220 in the mounting channel 230 according to an embodiment of the invention shown in FIG. 2, a first angled edge 215 of the first liner panel 210 is inserted into the mounting channel 230. After this a second angled edge 225 of the second liner panel 220 is inserted into the mounting channel 230. In this exemplary embodiment, the first angled edge 215 is shaped to fit inside the mounting channel 230 and extend around a back of the second angled edge 225.

The first liner panel 210 and the second liner panel 220 are then secured in place by insertion of the spline 240. The spline 240 has three parts: a securing tongue 242, a connecting strip 244, and a sealing member 246. The securing tongue 242 has a width greater than that of the connecting strip 244 and is shaped to engage curved sides 217 and 227 of the first liner panel 210 and the second liner panel 220, respectively. Once the first liner panel 210 and the second liner panel 220 have been inserted through the receiving opening 232 and into the mounting channel 230 as previously described, insertion of the securing tongue 242 forcibly secures the liner panels 210 and 220 in place.

The spline 240 can be forcibly inserted between the first liner panel 210 and the second liner panel 220 and into the mounting channel because of deformability of at least one of the mounting channel 230, the curved sides 217 and 227 of the first liner panel 210 and the second liner panel 220, and the securing tongue 242 in a plane parallel with the backside 236 of the mounting channel 230. In one presently preferred embodiment, the mounting channel 230 and the spline 240 are composed of metal and have little or no deformability in the plane parallel with the backside of the mounting channel 230. Nonetheless, the angled edges 215 and 225, particularly their curved sides 217 and 227, respectively, suitably provide sufficient deformability to allow the spline 240 to be inserted in place and sufficient rigidity to keep the spline 240 secured in place.

To install the spline 240, an installation force is applied to the sealing member 246 to force the securing tongue 242 in place. The spline 240 subsequently is not removable except by a greater total force than will be applied by weight of the liner panels 210 and 220, the spline, any cargo and personnel (not shown), and other incidental force applied during ordinary use. Although it is deliberately difficult to remove a liner panel 210 or 220, nonetheless, the liner panels 210 and 220 advantageously are removable so that they can be replaced if they are irreparably damaged.

Forces on the securing tongue 242 which hold the liner panels 210 and 220 in place also help to seal the joint between the liner panels 210 and 220. The force which maintains the securing tongue 242 in place also applies force through the connecting strip 244 on the sealing member 246, thereby pulling the sealing member 246 toward the backside 236 of the mounting channel against the liner panels 210 and 220. An underside of the sealing member 246 supports sealing strips 247 on either side of the connecting strip. The force pulling the sealing member 246 against the liner panels 210 and 220 compresses the sealing strips 247 against the liner panels 210 and 220, thereby sealing the joint between the spline 240 and the liner panels 210 and 220. In one presently preferred embodiment of the invention, the sealing strips 247 are composed of a high temperature silicone, although similar temperature resistant sealing compositions suitably can be used. The sealing strips 247 are integral to the sealing member 246. The sealing strips 247 can be secured to the spline by adhesion, mechanically engaged with the sealing member 256 in a tongue and groove structure, or any other technique securing the sealing strips 247 to the sealing member 246. An additional sealant suitably can be applied to further seal the sealing member 246 against the liner panels 210 and 220 at these joints, if desired, although an additional sealant is not warranted in presently preferred embodiments of the invention.

In sum, the exemplary embodiment of the present invention detailed in FIG. 2 simplifies installation over conventional liner panels as previously described. Advantageously, the present invention does not require cutting the panel material to size, drilling holes for securing the panels in place, and screwing or riveting the panels in place as do conventional liner panels. As previously described, this process can be particularly arduous while working over one's head. By contrast, the exemplary embodiment as detailed in FIG. 2 advantageously simplifies this process. It will be appreciated that the mounting channels 230 are less cumbersome to manipulate than a flexing sheet of panel material. Once the mounting channels 230 are in place, the rest of the installation process is fairly simple. Angled ends 215 and 225 of the liner panels 210 and 220 are inserted into place and then secured in place by inserting the spline 240 into the mounting channel 230 between the angled ends 215 and 225 of the liner panels.

Figure 3:
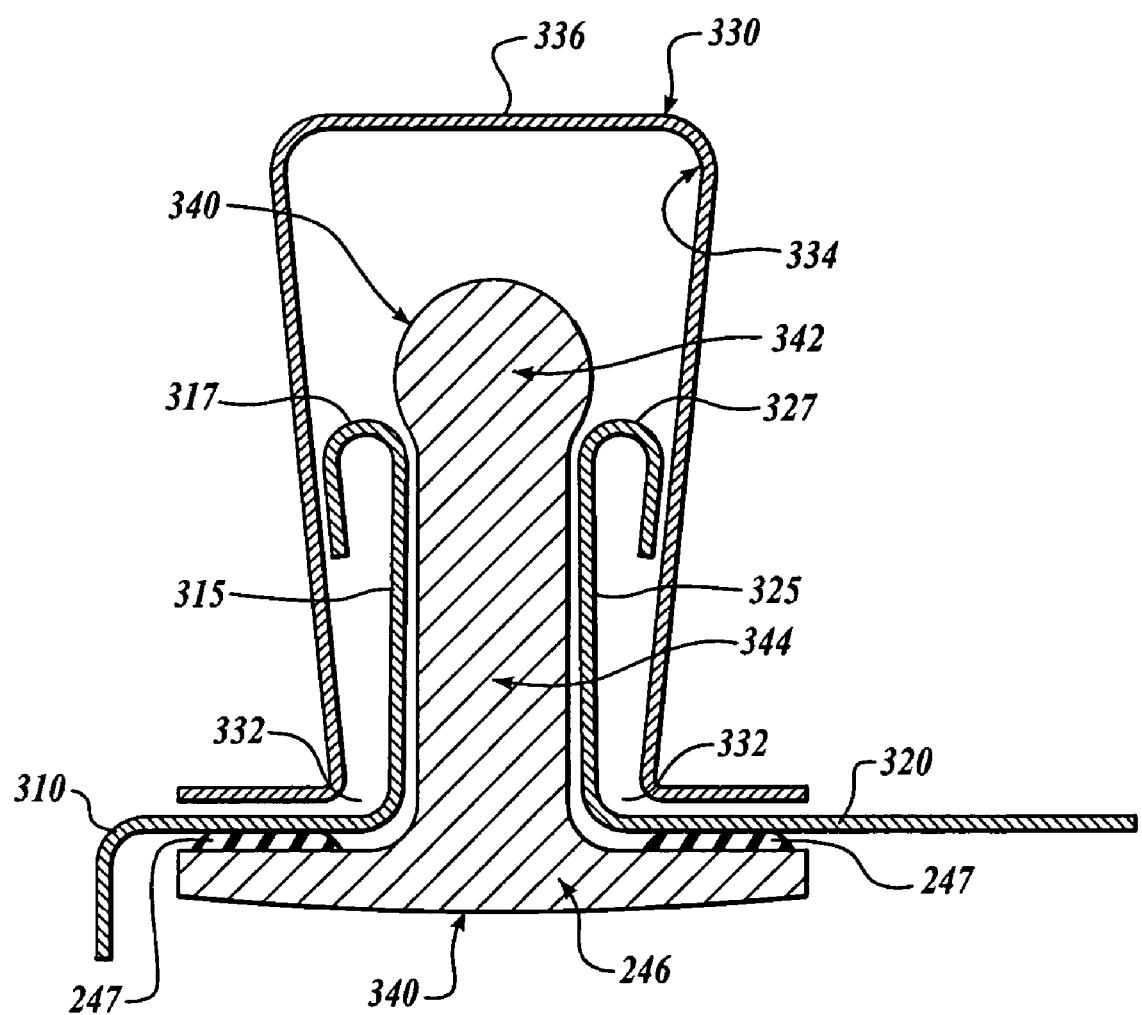
FIG. 3 is a cross-sectional view of angled edges of two liner panels joined in a mounting channel using a first form of angled edges of the liner panels.

FIG. 3 shows an alternate configuration of angled ends 315 and 325 of the liner panels 310 and 320, respectively, in another presently preferred embodiment. FIG. 3 also shows that embodiments of the present invention suitably are used to install and seal liner panels 310 and 320 at a corner of a compartment as well as at planar joints of liner panels as previously shown (FIG. 2). In the arrangement shown in FIG. 3, a first liner panel 310 suitably is a corner section with a curve 312 to form a corner. It will be appreciated that, in an alternative arrangement (not shown), a mounting channel 330 could be installed directly in a corner of a structure defining a compartment, the liner panels 310 and 320 could be planar, and the sealing member 346 of the spline 340 could be angled to secure the corner.

FIG. 3, in addition to showing a corner installation, also shows a different arrangement of the angled ends 315 and 325 of the liner panels 310 and 320, respectively, and the mounting channel 330. Instead of forming the angled ends 315 and 325 of the liner panels 310 and 320 to curl around each other and/or a securing tongue 346 of the spline 340, the angled ends 315 and 325 are formed with curled ends 317 and 327, respectively, having hairpin-shaped cross-sections. Also, a cross-section of the mounting channel 330 shows that the mounting channel 330 still again has a receiving opening 332 and a backside 336. However, the mounting channel 330 does not have a securing groove 234 (FIG. 2) at is midsection. Instead, the mounting channel 330 is wider at a backside 336 of the mounting channel than at the receiving opening 332, thereby effecting a different type of receiving groove in the mounting channel 330.

As in the previously described embodiment described in connection with FIG. 2, the liner panels 310 and 320 are secured in place by first inserting angled ends 315 and 325 into a mounting channel 330. Once the angled ends 315 and 325 are in place, the liner panels 310 and 320 are secured by inserting the spline 340 into the mounting channel 330 between the angled ends 315 and 325 of the liner panels, as in the previously described embodiment. In this arrangement, however, a force that secures the liner panels 315 and 325 and the spline 340 in place is generated by the curled ends 317 and 327 of the angled ends 315 and 327. The securing tongue 342 of the spline 340 is sized to engage and compress the curved ends 317 and 327 against inner walls of the mounting channel 330. The connecting strip 344 of the spline 340 is sized to maintain engagement between the securing tongue 342 and the curved ends 317 and 327 to maintain compression of the curled ends 317 and 327 against the securing tongue 342. The compression both forcibly maintains the liner panels 310 and 320 in place and effectively pulls the sealing member 346 of the spline 340 against the liner panels 310 and 320. Sealing strips 347 are disposed on an underside of the sealing member 346 and seal the spline 340 against the liner panels as previously described in connection with FIG. 2.

In addition to the two embodiments shown and described in connection with FIGS. 2 and 3, other shapes of the angled ends of the liner panels suitably allow a spline to secure liner panels into a mounting channel. Considering FIG. 2, angled ends 215 and 225 of the liner panels 210 and 220 need not overlap each other, but could abut each other around a securing tongue 242 of the spline. Alternatively, considering FIG. 3, the angled ends 315 and 325 of the liner panels 310 and 320 could curl inwardly toward the securing tongue 342 of the spline 340. Further alternatively, the angled ends 315 and 325 suitably could be flat and be secured by a suitably-shaped and/or deformable securing tongue 342 and mounting channel 330 to force the angled edges 315 and 325 of the liner panels 310 and 320 against inner sides of the mounting channel 330.

Similarly, the securing tongue of the spline could be shaped differently and still suitably secure the angled edges within the mounting channel. The cross-section of the securing tongue could be elliptical or pear-shaped instead of circular. Also, considering the example of FIG. 2, the securing tongue 242 could be diamond- or spade-shaped with its widest point engaging the securing groove 234. Considering FIG. 3, if one or both of the securing tongue 342 and the mounting channel 330 are sufficiently deformable, the securing tongue 342 could be trapezoidal in shape with a widened end at a distal end of the securing tongue 342. It will therefore be appreciated that the broad concepts of the present invention are not limited to particular shapes of the angled ends of the liner panels and the securing tongue of the spline.

Figure 4A:
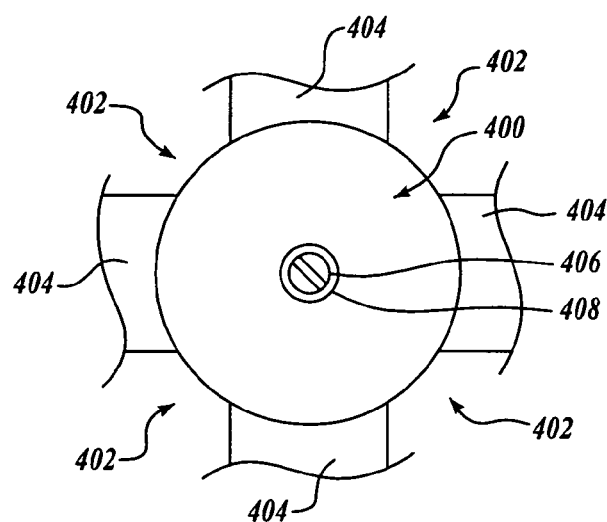
FIG. 4A is a top view of a joint and a joint cover installed where sections of spline meet.

It may be desirable to seal gaps between spline sections that come together at intersections between liner panels. FIG. 4A shows a top view of a junction cover 400 at a junction of liner panels 402 and spline sections 404. As will be further appreciated in connection with FIGS. 4B and 4C and their descriptions, the junction cover 400 seals gaps between spline sections 404 to enhance the smoke and fire suppressant sealing of a cargo hold formed by the liner panels 402 according to embodiments of the present invention. The junction cover 400 is secured with a fastener 406 to a mounting channel or other supporting structure behind the liner panels (not shown), further mechanically securing the spline sections 404 and thus the liner panels 402 in place. A gap between the fastener 406 and the junction cover is sealed with a washer 408 which, preferably, is heat resistant and suitably is composed of a material like that of which the sealing strips 247 (FIG. 2) and 347 (FIG. 3) are composed.

Figure 4B:
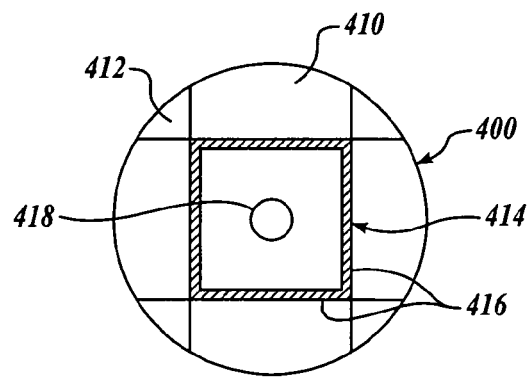
FIG. 4B is a bottom view of the joint cover of FIG. 4A.

FIG. 4B is a bottom view of the junction cover 400. In one presently preferred embodiment, the junction cover is shaped to receive the spline sections (not shown) with recesses 410 between raised sections 412 to engage surfaces of the liner panels (not shown). A plug 414 is shaped to extend into the mounting channel (not shown) and sealably engage ends of the spline sections (not shown). Outer surfaces of the plug 414 suitably are fitting with sealing layers 416 which, in one presently preferred embodiment, are composed of a material like that of which material like that of which the sealing strips 247 (FIG. 2) and 347 (FIG. 3) are composed. Although not shown in FIG. 4B, sealing layers 416 also are fitted on the recesses 410 and the raised sections 412 to further seal against outer surfaces of the spline sections (not shown) and liner panels (not shown), respectively. The sealing layers 416 seal against edges of the spline sections not shown to further support the integrity of a cargo hold to contain smoke and fire-suppressant agents.

Figure 4C:
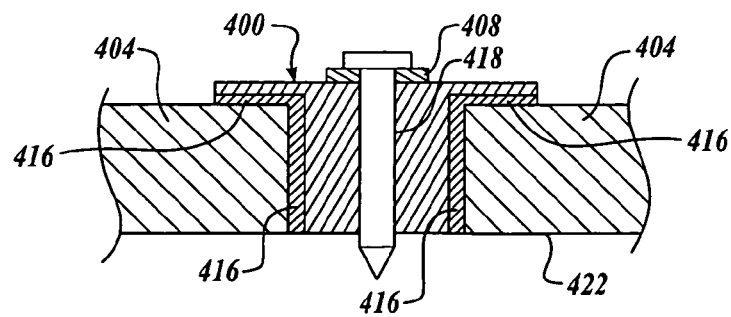
FIG. 4C is a cross-sectional view of a joint and a joint cover where sections of spline meet.

FIG. 4C is a cross-sectional view of the junction cover 400 installed between spline sections 404 in a mounting channel 422. The plug 414 of the junction cover 400 extends into the mounting channel 422, and the sealing layers 416 seal against ends and outer surfaces of the spline sections 404 and liner panels (not shown). The fastener 406 secures the junction cover 400 to the mounting channel 422. Engagement of the fastener 406 with the mounting channel compresses the sealing layers 416 against outer surfaces of the spline sections 404 and liner panels (not shown). The fastener 406 suitably is a screw, a rivet, a scrivet, a bolt, a bolt and nut, or a similar type of fastening device that extends through the junction cover 400 and securely engages the mounting channel 422. The washer 408 suitably is disposed between the fastener 406 and the junction cover 400 to seal any gap between the fastener 406 and the junction cover 400. It will be appreciated that coupling the joint cover 400 to the mounting channel 422 also further secures the spline sections 404 to the mounting channel 422, thereby further securing in place the liner panels (not shown) secured by the spline sections 404.

In addition to the apparatus for installing cargo liner panels previously described, other attributes of the embodiments of the present invention provide advantages over conventional cargo liner apparatuses. First, liner panels can be shaped to accommodate fixtures servicing the cargo hold and/or to structurally stiffen the panels. Using embodiments of the present invention, liner panels can be formed with shaped recesses in their surfaces to remove fixtures and/or covers from interfering with cargo loading and to protect them from damage. Referring back to FIG. 1, a concave recess 150 is formed in one of the liner panels 110 in the ceiling 120 of the cargo hold 100. The concave recess allows for a smoke detecting orifice 152, a fire suppression agent dispensing nozzle 154, and a light fixture 156 to be mounted outside a plane of a remaining roof line. As a result, the detecting orifice 152, the nozzle 154, and the light fixture 156 are sheltered from impact damage of laterally shifting cargo or personnel. In addition, as is understood by one ordinarily skilled in the creation and installation of structural panels, forming curved recesses in a planar panel can be used to structurally stiffen the panel. Concave recesses suitably are formed in the liner panels 110 for either or both reasons.

Second, inward facing surfaces 112 of the liner panels 110 can be presented to aid the loading and unloading of cargo in the cargo hold. To enhance visibility in the compartment, inward facing surfaces 112 of the liner panels 110 can be composed of a material which is light in color and/or reflects light. Using a material which is light in color and/or reflects light reflects light supplied by the light fixtures 156 or light that enters the cargo hold through one or more open doors. The use of inward-facing surfaces 112 that reflect ambient light increases visibility in the cargo hold, thereby making loading and unloading easier.

In addition, preformed line panels can be durably preprinted with the cargo hold location where they will be located. Using embodiments of the present invention, cargo hold locations 160 can be integrally printed on the cargo liner panel. Because liner panels 110 are preformed with angled edges and/or recesses to accommodate fixtures or stiffen panels, the liner panels 110 also can be pre-printed with a location where they might be installed.

Again referring back to FIG. 1, two cargo hold locations 160 are shown imprinted on liner panels 110. The cargo hold locations 160 can be applied using sublimation imprinting or any adaptable method which durably imprints the cargo hold locations 160 in the surface of the panels. Cargo hold locations 160 so imprinted are advantageously resistant to being scraped off. Moreover, being imprinted into the surface of the liner panels 110 is advantageously aesthetically appealing compared with labels adhered to panels using conventional liner paneling techniques.

Figure 5:
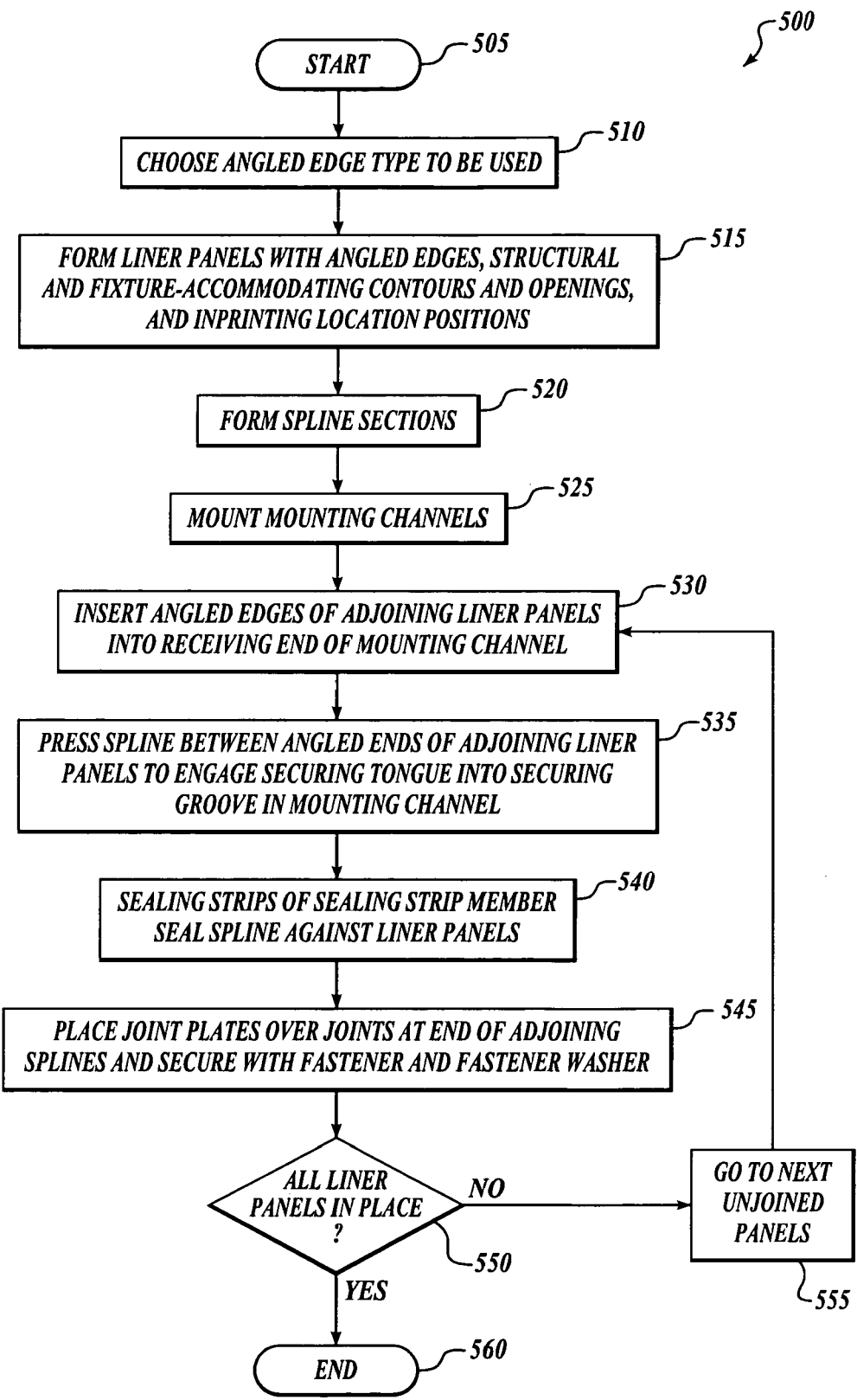
FIG. 5 is a flowchart of a method of the present invention.

FIG. 5 shows a flow chart of a routine 500 for installing liner panels in accordance with one presently preferred embodiment of the invention. The routine begins at a block 505 then proceeds with preparation of the liner panels at a block 510. More specifically, at the block 510 it is determined what type or types of angled edges are used, such as the overlapping angled edges of FIG. 2, the hairpin-shaped angled edges of FIG. 3, or another type. At a block 515, liner panels are formed to fit locations where they will be installed with angled edges, structural and/or fixture accommodating contours and openings, and/or with cargo location imprinting. At a block 520, spline sections are formed with which to secure the liner panels in place. At a block 525, mounting channels are installed in the cargo hold into which the cargo liners will be installed.

At a block 530, angled edges of cargo liner panels are inserted into receiving ends of the mounting panels. Once in place, at a block 535 spline sections are pressed into place to engage angled ends of the liner panels to secure the liner panels in place. At a block 540, if the sealing strips seal the spline against the liner panels to seal the cargo hold for smoke and fire suppression agent containment. At a block 545, joint covers are installed to cover gaps between adjacent spline sections. As previously described, installation of the joint covers suitably entails drilling attachment holes and securing the fasteners through the joint plate to the mounting channel and/or structure beneath, using a washer to seal between the fastener and the joint cover. At a decision block 550, it is determined if installation of liner panels is complete. If not, at a block 555, installation is directed to continue with the next liner panels at the block 530. If installation is complete, the installation routine ends at a block 560.

In sum, embodiments of the present invention provides many advantages. Installation suitably is accomplished without cutting and drilling panels, or having to support flexing panels while attempting to secure them in place. The spline-secured edges facilitate containment of smoke and fire suppression agents. Further, because panels are made to fit identified locations, openings for lights, smoke detectors, and suppression agent nozzles can be preformed in the panels, further simplifying installation. Also because panels are made to fit identified locations, cargo locations can be integrally printed onto the liner panels, providing for cargo location labels that are durable and that aesthetically match the cargo panels.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An apparatus for lining a compartment, comprising:
adjacent panels having formed edges that angle away from frontal sides of the adjacent liner panels;
a generally U-shaped mounting channel fixedly coupled to a supporting structure and having an opening configured to receive the formed edges of the liner panels; and
a spline configured to forcibly secure the liner panels into the U-shaped mounting channel when the spline is pressed against the angled edges of the liner panels and into the U-shaped mounting channel, wherein the spline includes a securing tongue, wherein the securing tongue is removable from the U-shaped mounting channel with an extraction force applied to the spline, the extraction force being applied in a direction opposite to an installation force.

2. The apparatus of claim 1, wherein at least one of the securing tongue and the U-shaped mounting channel is deformable such that when the spline is pressed against the formed edges of the cargo liner sections and into the U-shaped mounting channel, the securing tongue extends through the receiving opening of the mounting channel and is lockably received in a secured position.

3. The apparatus of claim 1, wherein the spline further comprises a connecting strip and a sealing member, the connecting strip joining the securing tongue to the sealing member such that the connecting strip forcibly pulls the sealing member over a joint between the liner panels coupled by the U-shaped mounting channel and sealing the joint when the securing tongue is pressed into a secured position between the cantilever springs on the liner panels.

4. The apparatus of claim 3, wherein the sealing member includes sealing strips sealing the joint between liner panels such that the joint sealed by the sealing strips contains smoke and fire suppression agents.

5. The apparatus of claim 1, further comprising a junction cover configured to cover a junction between spline sections.

6. The apparatus of claim 1, wherein the adjacent panels having formed edges that angle away from frontal sides of the adjacent liner panels interact as cantilever springs to secure the spline when the spline is inserted between the U-shaped mounting channel and the adjacent panels.

7. The apparatus of claim 6, wherein the cantilever springs are configured in a U-shape.

8. The apparatus of claim 1, wherein the U-shaped mounting channel further comprises opposing side walls that taper outwardly as the side walls extend away from the receiving opening.

9. The apparatus of claim 1, wherein the spline includes a connecting strip in connection with the securing tongue, the securing tongue having a first width larger than a second width of the connecting strip.

10. An apparatus for lining a compartment, comprising:
adjacent panels having formed edges that angle away from frontal sides of the adjacent liner panels, the formed edges terminating in cantilever springs;
a generally U-shaped mounting channel fixedly coupled to a supporting structure and having an opening configured to receive the formed edges of the liner panels; and
a spline configured to forcibly secure the liner panels into the U-shaped mounting channel when the spline is pressed against the angled edges of the liner panels and into the U-shaped mounting channel.

11. The apparatus of claim 5, wherein the spline further comprises a sealing member, a securing tongue spaced apart from the connecting strip, and a connecting strip that extends between the sealing member and the securing tongue, the connecting strip having a width that is less than a width of the opening, and the securing tongue having a width greater than the width of the connecting strip.

12. The apparatus of claim 11, wherein at least one of the securing tongue and the U-shaped mounting channel is deformable such that when the spline is pressed against the formed edges of the cargo liner sections and into the U-shaped mounting channel, the securing tongue extends through the receiving opening of the U-shaped mounting channel and is positioned between respective cantilever springs of the formed edges to lockably retain the formed edges in the U-shaped mounting channel.

13. The apparatus of claim 12, wherein the U-shaped mounting channel further comprises opposing side walls that taper outwardly as the side walls extend away from the receiving opening.

14. The apparatus of claim 11, wherein the sealing member includes sealing strips sealing the joint between liner panels such that the joint sealed by the sealing strips contains smoke and fire suppression agents.

15. The apparatus of claim 10, further comprising a junction cover configured to cover a junction between spline sections.

16. An apparatus for lining a compartment, the apparatus comprising:
a plurality of liner panels each being formed to fit particular locations within the storage compartment and having angled edges angling away from frontal sides of the liner panels;
a generally U-shaped mounting channel coupled to a supporting structure and having a receiving opening configured to receive the angled edges of the liner panels;
a spline configured to fixably secure the liner panels into the U-shaped mounting channel and seal a joint between the liner panels from smoke and fire suppression agents when the spline is pressed against the angled edges of the liner panels and into the U-shaped mounting channel;
a junction cover sealably covering junctions between spline sections; and
a fastener, such that the junction cover and an underlying spline section are secured to at least one of the U-shaped mounting channel and the supporting structure.

17. The apparatus of claim 16, wherein the spline includes a securing tongue in connection with a connecting strip, the securing tongue having a first width larger than a second width of the connecting strip.

18. The apparatus of claim 17, wherein at least one of the securing tongue and the U-shaped mounting channel is deformable such that when the spline is pressed against the angled edges of the cargo liner sections and into the U-shaped mounting channel the securing tongue is pressable through the receiving opening of the U-shaped mounting channel into a secured position.

19. The apparatus of claim 16, wherein the angled edges of the liner panels are formed into cantilever springs such that when the securing tongue is pressed against the angled edges and into the U-shaped mounting channel, the cantilever springs are compressed against inner walls of the U-shaped mounting channel.

20. The apparatus of claim 16, wherein the spline further comprises a connecting strip and a sealing member supporting sealing strips, the connecting strip joining the securing tongue to the sealing member such that the connecting strip forcibly pulls the sealing member over the joint between the liner panels coupled by the U-shaped mounting channel and compressing the sealing strips to seal the joint when the securing tongue is pressed into a secured position between the cantilever springs on the liner panels.

21. The apparatus of claim 16, wherein the U-shaped mounting channel further comprises opposing side walls that taper outwardly as the side walls extend away from the receiving opening.

* * * * *